United States Patent
Hauer et al.

(10) Patent No.: US 11,370,622 B2
(45) Date of Patent: Jun. 28, 2022

(54) SUPPORT STRUCTURE FOR A PLANAR MOTOR

(71) Applicant: B&R INDUSTRIAL AUTOMATION GMBH, Eggelsberg (AT)

(72) Inventors: Michael Hauer, Eggelsberg (AT); Stefan Flixeder, Eggelsberg (AT); Martin Haudum, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 17/239,895

(22) Filed: Apr. 26, 2021

(65) Prior Publication Data
US 2021/0331878 A1    Oct. 28, 2021

(30) Foreign Application Priority Data

Apr. 27, 2020 (AT) .............................. A 50357/2020

(51) Int. Cl.
*B65G 54/02* (2006.01)
*H02K 41/02* (2006.01)
*B65G 23/22* (2006.01)
*H02K 41/03* (2006.01)

(52) U.S. Cl.
CPC .............. *B65G 54/02* (2013.01); *B65G 23/22* (2013.01); *H02K 41/02* (2013.01); *H02K 41/031* (2013.01)

(58) Field of Classification Search
CPC ........ H02K 41/031; H02K 41/02; B23Q 3/02; B65G 23/23; B65G 23/22; B65G 54/02
USPC ......................................................... 198/805
See application file for complete search history.

(56) References Cited

U.S. PATENT DOCUMENTS

| | | | |
|---|---|---|---|
| 5,334,892 A * | 8/1994 | Chitayat .............. | H02K 41/031 310/12.13 |
| 6,003,230 A | 12/1999 | Trumper et al. | |
| 6,339,266 B1 * | 1/2002 | Tanaka .................. | H02K 41/03 310/91 |

(Continued)

FOREIGN PATENT DOCUMENTS

| | | | |
|---|---|---|---|
| EP | 1 621 284 | 2/2006 | |
| WO | 2018/176137 | 10/2018 | |
| WO | 2021084079 | * 10/2020 | ............. H02K 41/02 |

OTHER PUBLICATIONS

Austria Search Report conducted in counterpart Austria Appl. No. A 50357/2020 (dated Mar. 11, 2021).

*Primary Examiner* — James R Bidwell
(74) *Attorney, Agent, or Firm* — Greenblum & Bernstein, P.L.C.

(57) ABSTRACT

Support structure for a transport unit of a planar motor to reduce or prevent transmission of force to an active surface of a stator. The transport unit is movable by at least one stator of the planar motor and a product is positionable on the transport unit. In at least one support position of the transport unit defined in relation to the support structure, the support structure applies at least one supporting force to the transport unit, while at least one process force, which acts on the product, is at least partially transmitted to the transport unit and counteracted. The transport unit is movable into and out of the support position in a floating manner via the at least one stator. The support structure is mounted on a base and at least partially diverts the counterforce caused by the supporting force to the base.

17 Claims, 5 Drawing Sheets

(56) References Cited

U.S. PATENT DOCUMENTS

| | | | |
|---|---|---|---|
| 8,430,233 B2 * | 4/2013 | Fischer | H02K 41/033 |
| | | | 198/465.1 |
| 8,485,507 B2 | 7/2013 | Inoue et al. | |
| 9,202,719 B2 | 12/2015 | Lu et al. | |
| 11,193,812 B2 * | 12/2021 | Derrick | G01G 11/04 |
| 2005/0093378 A1 * | 5/2005 | Ohishi | G03F 7/70758 |
| | | | 318/135 |
| 2006/0013675 A1 | 1/2006 | Bernhard et al. | |
| 2018/0308735 A1 * | 10/2018 | Janakiraman | H01L 21/67736 |

\* cited by examiner

SUPPORT STRUCTURE FOR A PLANAR MOTOR

CROSS-REFERENCE TO RELATED APPLICATION

The present application claims priority under 35 U.S.C. § 119(a) of Austria Patent Application No. A50357/2020 filed Apr. 27, 2020, the disclosure of which is expressly incorporated by reference herein in its entirety.

BACKGROUND

1. Field of the Invention

The present disclosure relates to a support structure for a planar motor.

2. Discussion of Background Information

Planar motors are well known in the prior art. For example, U.S. Pat. No. 9,202,719 B2 discloses the basic structure and mode of operation of such a planar motor.

A planar motor essentially has a transport plane along which one or more transport units ("shuttles") can be moved mainly in two dimensions. Drive coils, which are controlled by a control unit in order to generate a moving magnetic field in the desired direction of movement and are distributed on the transport plane, are usually provided on the planar motor for this purpose. The (usually fixed) units that contain the drive coils and form the transport plane are generally referred to as stators. Alternatively, movable permanent magnets can also be provided for generating the moving magnetic field. In connection with the present disclosure, the stationary units of the planar motor are generally referred to as stators and the units moved on the stators as transport units, regardless of the mode of operation.

Drive magnets (permanent magnets or electromagnets) are arranged distributed two-dimensionally on the transport unit and interact with the magnetic field of the stator so that a force is exerted on the transport unit in the desired direction of movement. The drive coils and the drive magnets are advantageously arranged in such a way that, in addition to a one-dimensional movement along the axes spanned by the transport plane, more complex two-dimensional movements of the transport unit in the transport plane are also possible. A planar motor can be used as a transport device in a production process, for example, wherein very flexible transport processes with complex movement profiles can be implemented.

Modern planar motors make it possible to carry out high-precision movements of a transport unit floating above the stator in the direction of all six rigid body degrees of freedom. Thanks to the modular structure of the stator (in the form of a segment arrangement), translational movements in two main directions of movement are essentially possible without restriction. In addition, a translation in the third spatial direction ("lifting" or "lowering") and limited rotations (up to a certain deflection) can also be performed. The motor forces and torques required for this are generated via (electro)magnetism.

However, due to the action of process forces and process moments, such as inertia forces and/or forces and moments that act in processing stations on the product transported by the transport unit and are transmitted from the product to the transport unit, it can be the case that the motor forces and moments are not sufficient to adequately counteract the sum of the loads on the shuttle, in particular the given process forces and process moments. It can also happen that the shuttle touches or hits the sensitive surfaces of the stator tiles and damages them in the process.

WO 2018/176137 A1 discloses planar motors with numerous differently designed shuttles and stators. Among other things, this document teaches how to secure the stator with guideways in a transfer region between a stator of the planar motor and a statorless transport system (e.g. a conveyor belt, robot gripper or similar), so that the shuttle is first floated from the stator into the guideway, then slides on the guideway (e.g. on rollers) and is moved on by the statorless transport system when it has left the region of the magnetic action of the stator.

Furthermore, planar motors are known in the art which have shuttles with rolling elements (in particular balls or rollers). The shuttles do not float over the stators, but roll on their surface and are only moved in the direction of the surface by the stators. This allows higher payloads, but at a cost of additional friction losses, and it is accompanied by wear of the elements of the planar motor. In addition, there is a risk of damaging the surfaces of the stator tiles or they must be built to be particularly stable.

SUMMARY

Embodiments of the present disclosure alleviate the disadvantages of the prior art. In particular, the maximum permissible process forces should be increased without impairing the functionality of the planar motor.

These and other tasks are resolved in accordance with the present disclosure in a first aspect by a support structure for a transport unit of a planar motor, wherein the transport unit is movable by at least one stator of the planar motor and the product can be arranged on the transport unit, wherein in at least one support position of the transport unit defined in relation to the support structure the support structure applies at least one supporting force to the transport unit, while at least one process force acts on the product, wherein the process force is at least partially transmitted from the product to the transport unit, wherein the at least one supporting force counteracts the at least one process force, wherein the transport unit is movable in a floating manner into the support position and out of it via of the at least one stator of the planar motor, wherein the support structure is mounted on a base, wherein the support structure at least partially diverts the counterforce caused by the support force to the base, and wherein a transmission of force to an active surface of the stator is reduced and preferably is completely prevented. As a result, the unit made up of transport unit and product can be supported or held in a way that is precisely tailored to the occurring process forces, wherein the permissible process forces are no longer limited by the maximum motor forces and torques that can be achieved with the combination of stator and transport unit. It is not necessary to stress the stator surface with additional forces, because the process forces are transferred to the base, which is independent of the stator surface. Nevertheless, at least the forces that may still act on the active surface of the stator can be reduced to the extent that they are spared and damage thereto is prevented.

In connection with the present disclosure, the term "active surface of the stator" denotes the surface of the stator over which the transport unit can be held or moved in a floating manner. Because the base is independent of the stator surface, it is able to absorb forces without this having negative effects on the structures of the stator that are active as a motor (i.e. in particular the sensitive stator surface of the stator tiles) and without the forces being transmitted from the support structure to the stator surface. At least forces that may still act on the active surface are reduced to the extent that they are spared and damage is prevented. The base can also be a housing or a bracket to which the stator tiles or the stator elements that form the stator surface are fastened. Mounting points to which the stators are attached or to which stators are attached to one another can also be used as a base.

A process force can in particular be a force applied by a tool, a magnetic or electromagnetic force, an inertial force, a moment caused by such forces, or a combination of such forces. Examples of forces applied with a tool include forces applied by the action of a tool (such as clamping forces, forces applied to deform workpieces, forces that act on a workpiece during machining, contact forces, e.g. from rollers, etc.). Examples of applied moments include, but are not limited to, the application of screwable elements (such as screws, nuts or screw caps, for example when closing containers such as bottles) or machining with rotating tools (for example when drilling, milling, grinding or cutting). Examples of inertial forces and moments include, but are not limited to, forces and moments that act on the product or parts of the product when it is accelerated (such as when the product is placed on the transport unit, when a product is filled with a filling material, e.g. when liquids flow in, when braking and/or accelerating the shuttle in the region of the support structure).

In the broader sense, a process force can also be a gravitational force which acts on the product in an extraordinary way only during a process. For example, the supporting force can serve to absorb a short-term overloading of the shuttle.

The base can advantageously be mounted on a support structure on which at least one stator is mounted. On the other hand, another carrier structure that is not in direct contact with the stator can also be arranged on the base.

The support structure can advantageously act on the transport unit in a contactless manner. This prevents frictional losses and wear and tear on the transport unit caused by friction. The contactless action can take place, for example, electromagnetically (for example, via of additional coil arrangements), magnetically (for example, by permanent magnets) or pneumatically (for example, by air nozzles directed at the transport unit).

The support structure can advantageously have a support coil arrangement which acts on a drive magnet arrangement and/or on a support magnet arrangement of the transport unit. As a result, the magnetic force applied to the transport unit can be increased in a targeted and controlled manner while the product is being processed in the support position.

In a further advantageous embodiment, the support structure can have a slip-inhibiting shaped structure which in particular has a support mat, a frame and/or at least one elevation. This is a particularly simple, inexpensive and effective solution.

The support structure can optionally have a sliding structure, which in particular can have at least one profile rail, a rail guide, a lateral guide and/or a sliding surface. As a result, the unit made up of transport unit and product can continue to slide (to a limited extent) on the support structure during processing, wherein the movement is matched to the processing.

The support structure can advantageously form a guide structure into which a holding arrangement arranged on the transport unit can be brought for engagement. As a result, a support structure independent of the shape of the transport unit can be created, wherein different transport units can be equipped with the holding arrangement.

In a further advantageous embodiment, the guide structure can form a linear guide in which a sliding element of the holding arrangement can be brought into sliding engagement. This in turn allows the transport unit to move in a guided manner during processing.

The present disclosure also relates to a processing station for processing a product which can be arranged on a transport unit of a planar motor, wherein at least one process force acts on the product during processing and is transmitted via the product to the transport unit, wherein the processing station has at least one support structure described herein and wherein the transport unit can be arranged in at least one support position during processing.

The process force can advantageously be a force applied by a tool, a magnetic or electromagnetic force, an inertial force, a moment caused by such forces, or a combination of such forces.

In a further aspect, the present disclosure relates to a planar motor having at least one processing station disclosed herein and/or a support structure disclosed herein.

In a further aspect, the present disclosure relates to a method for the controlled drive of a transport unit having a planar motor, which is equipped with at least one support structure and/or processing station disclosed herein, wherein the method comprises the following steps: floating movement of the transport unit via at least one stator of the planar motor in a support position, application of at least one process force which acts on a product arranged on the transport unit and is transmitted to the transport unit, application of at least one supporting force via the support structure to the transport unit, wherein the supporting force counteracts the at least one process force, and floating movement of the transport unit out of the support position via the at least one stator of the planar motor.

In connection with the present disclosure, an arrangement of the transport unit in which an air gap remains between a drive magnet arrangement of the transport unit and a transport plane of a stator, and the stator and transport plane are in contact with each other is referred to as "floating."

In connection with the present disclosure, "process forces" refer to both forces and moments which only act on the transport unit and/or the product during a specific movement and/or acceleration of the transport unit and/or during processing in a processing station. The process forces also include inertial forces that result from a movement of the transport unit 4 and/or the product 3 during processing. Process forces can, for example, be applied to the product by mechanical action, but they can also act on the product without contact, as can be the case, for example, with pneumatic nozzles or magnets. This definition is also to be applied analogously to all other described forces and moments, in particular the supporting forces.

Embodiments are directed to a support structure for a transport unit of a planar motor, wherein the transport unit is movable by at least one stator of the planar motor and a product can be arranged on the transport unit. The support structure includes at least one support position at which at least one supporting force is applied to the transport unit, while at least one process force acts on the product, wherein the process force is at least partially transmitted from the product to the transport unit, and the at least one supporting force counteracts the at least one process force, wherein the transport unit is movable in a floating manner into and out of the support position via the at least one stator of the planar motor, a base to which the support structure is mounted so as to at least partially divert counterforces caused by the support force to the base. The support position is arranged so that a transmission of force to an active surface of the stator is reduced.

In embodiments, the support position can be arranged so that a transmission of force to an active surface of the stator is prevented.

According to embodiments, the base may be mounted on a supporting structure to which at least one stator is mounted.

In other embodiments, the support structure can be arranged to act without contact on the transport unit.

According to further embodiments, the support structure can include at least one of a support coil arrangement or a support magnet arrangement which acts on at least one of a drive magnet arrangement or a support magnet arrangement of the transport unit.

According to other embodiments, the support structure can include a slip-inhibiting shaped structure. The slip-inhibiting shaped structure may include at least one of a support mat, a frame, or at least one elevation or depression.

In still other embodiments, the support structure can include may include a sliding structure. The sliding structure comprises at least one profile rail, rail guide, lateral guide or sliding surface.

In further embodiments, the support structure may form a guide structure into which a holding arrangement arranged on the transport unit can be brought for engagement. The guide structure can form a linear guide in which a sliding element of the holding arrangement can be brought into sliding engagement.

Embodiments are directed to a processing station for processing a product that is arranged on a transport unit of a planar motor, wherein at least one process force, which acts on the product during processing, is transmitted via the product to the transport unit. The processing station includes at least one of the above-described support structure embodiments. The transport unit is positionable in the at least one support position during the processing.

According to embodiments, the process force may be a force applied by at least one of a tool, a magnetic or electromagnetic force, an inertial force, a moment caused by such forces or a combination of such forces.

In embodiments, the processing station may further include a base. The support structure can be mounted to the base, and the support structure may at least partially divert a counterforce caused by the support force to the base. The base may be mounted on a supporting structure to which at least one stator is mounted.

Embodiments are directed to a planar motor that includes an embodiment of the above-described processing station.

Embodiments are directed to a method for a controlled drive of a transport unit along the above-described planar motor embodiments. The method includes floating movement of the transport unit into a support position via at least one stator of the planar motor, applying at least a process force that acts on a product arranged on the transport unit and is transmitted to the transport unit, applying at least a supporting force via the support structure to the transport unit, wherein the support force counteracts the at least one process force, and floating movement of the transport unit out of the support position via the at least one stator of the planar motor.

Other exemplary embodiments and advantages of the present invention may be ascertained by reviewing the present disclosure and the accompanying drawing.

BRIEF DESCRIPTION OF THE DRAWINGS

In the following, the present invention shall be described in greater detail with reference to FIGS. 1 to 14, which show exemplary, schematic and non-limiting advantageous embodiments of the invention. In the drawings

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
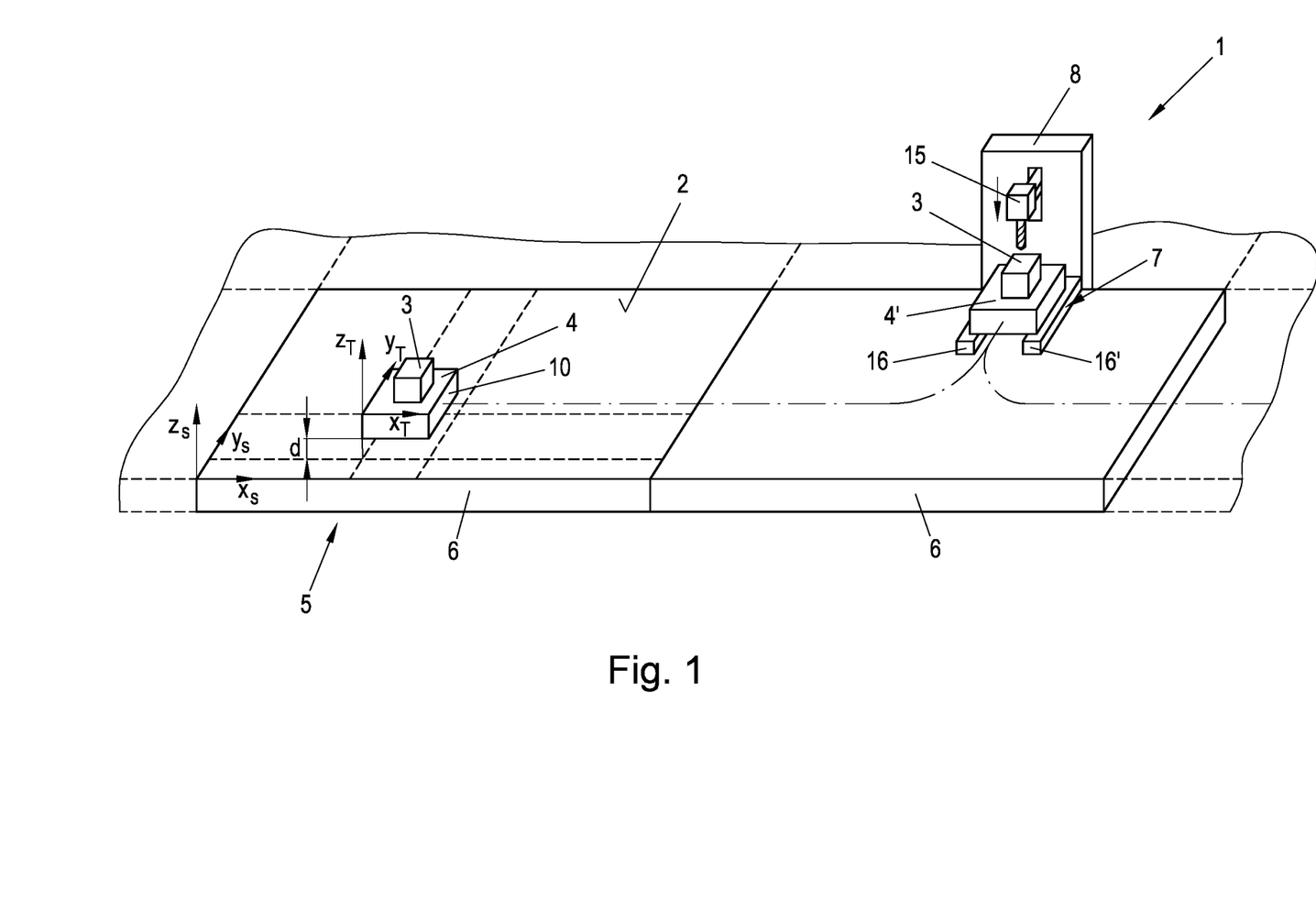
FIG. 1 is a diagrammatic and schematic representation of a planar motor with a processing station.

FIG. 1 shows a schematic representation of a planar motor 5 with a processing station 1 arranged thereon. The planar motor 5 has a planar arrangement of stators 6 which form a transport plane 2 on which a plurality of transport units 4, 4' can be arranged. The stators 6 of the planar motor are usually arranged rigidly to one another and fixed in space, so that spatial positions in relation to the transport plane 2 can be specified in a spatially fixed coordinate system ($x_S$, $y_S$, $z_S$). The coordinate system can be defined, for example, in such a way that the transport plane 2 lies in the $x_S$-$y_S$ plane. Any number of stators 6 can be arranged in the transport plane 2, each of which can expand the movement space of the transport units 4 accordingly. The axes of the spatially fixed coordinate system are usually also referred to as the first main axis $x_S$, second main axis $y_S$ and the vertical axis $z_S$. The terms "first main axis," "second main axis" and "vertical axis" are used in connection with the present disclosure only to make the description easier to understand and are not to be interpreted as restrictive.

If necessary, a separate coordinate system can be defined for each stator 6. This is useful, for example, when individual stators 6 are designed to be movable with respect to others. For example, individual stators 6 can serve as "elevators" or "transport platforms" which, together with the transport units 4 arranged thereon, can be moved into different positions and/or between different transport levels, or the stators 6 can also be tilted or pivoted.

The teachings of the present disclosure can be applied to numerous different embodiments of planar motors 5 and, in particular, are not restricted to the variant shown with a single transport plane 2.

In each stator 6, coils are arranged in one or more layers in a manner known per se to which a coil current can be applied individually in a regulated manner, wherein the coil then generates a magnetic field. By such a regulated control of the coils, regionally limited magnetic fields can be generated, the position and time course of which can be changed within the movement range of the transport plane 2 defined by the arrangement of the stators 6. Alternatively or additionally, movable permanent magnets can also be used which likewise generate a variable magnetic field.

On the underside of the transport units 4, a drive magnet arrangement 10 is in turn provided which interacts with the magnetic field generated by the stator. The drive magnet arrangement 10 usually includes a flat arrangement of permanent magnets which form an alternating magnetic pattern in regions, each of which has a different polarity (N/S). The drive magnet arrangement 10 can optionally also have electromagnets if the magnet pattern of the drive magnet arrangement 10 is to be changeable. The design of the planar motor can, however, also function according to a reverse principle, wherein an arrangement of permanent magnets is arranged on the transport plane and the coil arrangement is provided on the transport units. It should be noted that the present disclosure is not restricted to a specific embodiment, but can be applied to any type of planar motor, provided that there are no technical restrictions to the contrary and nothing to the contrary is expressly stated herein.

The transport unit 4 can be assigned a fixed-body coordinate system ($x_T$, $y_T$, $z_T$) defined in relation to the transport unit 4, wherein the position of the transport unit 4 in relation to the spatially fixed coordinate system of the stator 6 (or the stators) can be defined by a corresponding coordinate transformation.

With the magnetic field generated by the stator 6, the transport unit 4 is held in suspension above the transport plane 2, wherein an air gap d remains between the transport plane 2 and the underside of the transport unit. A stable magnetic floatation is made possible by continuously changing the magnetic field in a closed control loop. This principle is also known as "active floating" (or "electromagnetic suspension").

Due to the controlled change in the magnetic field, the transport unit can now not only be moved parallel to transport plane 2 (i.e. in the direction of axes $x_S$ and $y_S$), but also a (limited) movement along axis $z_S$ is possible by increasing and weakening the magnetic field, wherein the air gap changes. As a result, the transport unit 4 can be raised and lowered along the vertical axis. Furthermore, a (possibly restricted) rotation of the transport unit 4 about its vertical axis $z_T$ (yaw) may also be possible and a rotation about the first main axis $x_T$ (roll) and/or about the second main axis $y_T$ (nod) may be possible to a limited extent.

Any objects which, in connection with the present disclosure, are generally and non-restrictively referred to as "product" can be arranged on the transport unit. This term encompasses any objects that can be arranged on a transport unit 4 of a planar motor 5 and thus transported. If necessary, the transport unit can have fasteners and/or receivers which facilitate or allow the arrangement and the safe transport of the product. The product 3 can have any shape and is shown schematically in FIG. 1 as a cube-shaped object. Examples of products that can be transported with a transport unit 4 of a planar motor 5 and processed in a processing station 1 include electronic components or products, such as components for microcomputers, mobile phones or the like, components in a production process (screws, bearings, etc.), liquid containers (such as bottles, cans, test tubes), medicaments and drugstore products, food (e.g. sliced cheese), but the present invention is not limited to these exemplary applications.

For numerous applications, it is advantageous to process the product 3 arranged on the transport unit 4. In FIG. 1, a processing station 1 is arranged on an edge of a stator 6 of the planar motor 5 for this purpose. The processing station 1 has a base 8 which is arranged next to the stator 6 and is preferably mounted independently thereof. A tool 15 with which a product 3 can be processed is movably arranged on the base 8. For the sake of simplicity, the tool shown in FIG. 1 has a simple drill which can be moved along an axis in the drilling direction. The processing station 1 is shown purely by way of example in FIG. 1, and the teachings disclosed herein can be applied to any types of processing stations 1. The processing station can carry out any process and/or manufacturing processing. Examples of processing stations 1 include stations for mechanical processing (such as drilling, milling, cutting, joining, etc.), stations for assembling components (for example joining measures such as clamping, pressing, pulling, screwing, welding, gluing, etc., or the closing of containers using rotary keys or (crown) corks) and stations for procedural processes (such as filling, mixing, cleaning, etc.), but the present invention is not limited to these processing stations.

In order to process a product 3 in the processing station 1, the transport unit 4 on which the product is located is moved into a support position which is identified in FIG. 1 by the reference symbol 4'. The transport unit 4 can move the product 3 in a floating manner into the support position, position it there very precisely and, after processing, move the product out of the support position again in a floating manner. Particularly when there is a mechanical force acting on the product 3 (e.g. when drilling a hole or similar processes shown in FIG. 1), the maximum holding force that can be applied by the stator 6 to the transport unit during the processing may be insufficient to keep the product 3 securely and sufficiently positionally precise in the support position. This can have the consequence that the product 3 together with the transport unit 4 moves in an impermissible manner while the process force required for the processing acts on the product.

In order to prevent this impermissible movement, a support structure 7, which supports the unit made up of transport unit 4 and product 3 in at least one spatial direction, is arranged in the region of the support position. In FIG. 1, the support structure 7 includes two elongated support elements 16, 16' which are fastened to the base 8 and extend into the movement space of the planar motor 5 just above the transport plane 2. The support elements 16, 16' are low enough to allow the planar motor 5 to float the unit comprising transport unit 4 and product 3 into and out of the support position 4'. This prerequisite is generally given when the thickness of the support elements (in relation to the vertical axis $z_S$) is less than the maximum achievable air gap d.

As soon as the transport unit 4 has reached the support position 4', it can be lowered a little, if necessary, until the transport unit 4 rests in a defined position on the support elements 16, 16', so that further movement of the unit comprising transport unit 4 and product in the direction of the negative direction vertical axis $-z_S$ is no longer possible. If necessary, the support elements 16, 16' can form a form-fitting receptacle for the transport unit 4, so that supporting forces are applied not only in the direction of the vertical axis, but also supporting forces and/or supporting moments in other spatial directions.

Figure 2:
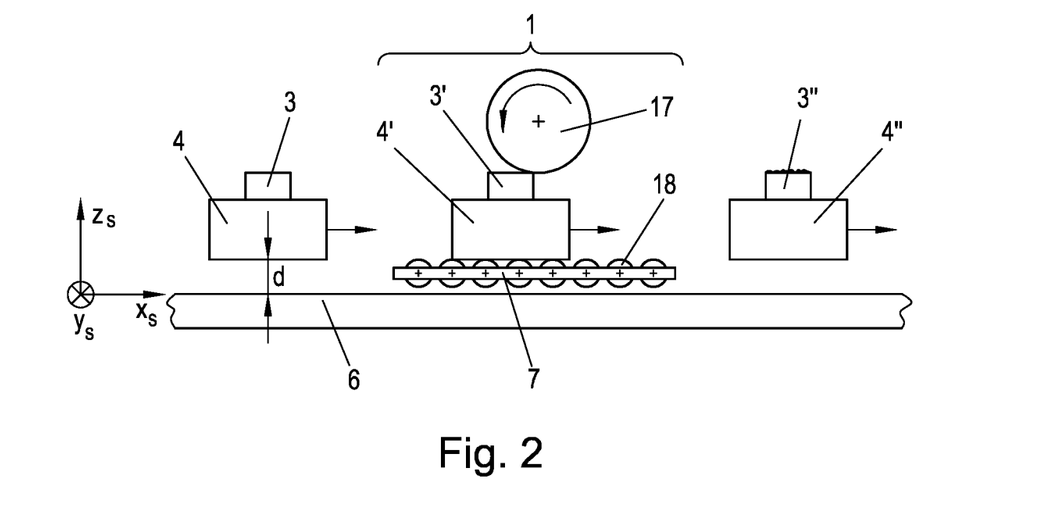
FIG. 2 is a representation of a planar motor with a processing station according to a further embodiment in a schematic side view.

FIG. 2 shows a further example of a processing station 1. In this case, a product 3 is processed with a roller arrangement 17, while the product is moved by the transport unit 4 under the roller arrangement 17 in a movement matched to the roller speed. The roller arrangement can, for example, be part of a printing unit or have an embossing roller, which prints an upper side of the product 3 or provides it with an embossing. The unit made up of transport unit 4 and product 3 is moved out of a first position (reference numbers 3, 4) shown in FIG. 2 in a floating manner from stator 6 into the processing station 1 (reference numbers 3', 4), wherein the transport unit 4 on its underside comes into attachment on a support structure 7, which in this case is designed as a roller arrangement 18. While the unit made up of transport unit 4 and product 3 is in the region of processing station 1, roller arrangement 18 allows further straight movement in the direction of the first main axis $x_S$, but a movement in the direction of the negative vertical axis $-z_S$ is in turn prevented by support structure 7. In this case, the support structure 7 designed as a roller arrangement 18 absorbs the pressure force (or process force) applied by the roller arrangement 17 to the product 3.

In an alternative embodiment, instead of the roller arrangement 18, any roller or slide bearing arrangement, for example a ball bearing arrangement, can be provided which applies a supporting force to the transport unit 4 only along the vertical axis and a movement both in the direction of the first main axis $x_S$ and the second main axis $y_S$, as well as a rotation about the vertical axis $z_S$ are essentially unimpaired. If necessary, the processing operation can be regulated by the movement of the transport unit 4 in relation to the processing station 1, for example by the movement of the transport unit 4 generating a specific processing pattern.

In the examples shown in FIG. 1 and FIG. 2, a process force is applied (and absorbed by the support structure 7) which is oriented essentially normal to the transport plane 2, i.e., it acts along the negative vertical axis $-z_S$. The support structure 7 can, however, also be designed and arranged so as to limit the movement of the unit made up of the transport unit 4 and the product 3 in one or more other directions or also in almost any manner in terms of rotation.

The present disclosure is not restricted to the process forces shown in the figures. Rather, taking into account the teachings disclosed herein, any desired support structures 7 can be created in order to set corresponding support forces against a multiplicity of different process forces. For example, magnetic forces can act on the product 3 and/or the transport unit 4, or inertial forces can act. Process forces can arise, for example, through any acceleration of the transport unit 4, through loading or unloading of the product, or through the action of material flows. For example, products can be dried in an airstream that generates a flow force on the product that represents a process force. Using the teachings disclosed herein, support structures can be created to absorb any such process forces.

Figure 3:
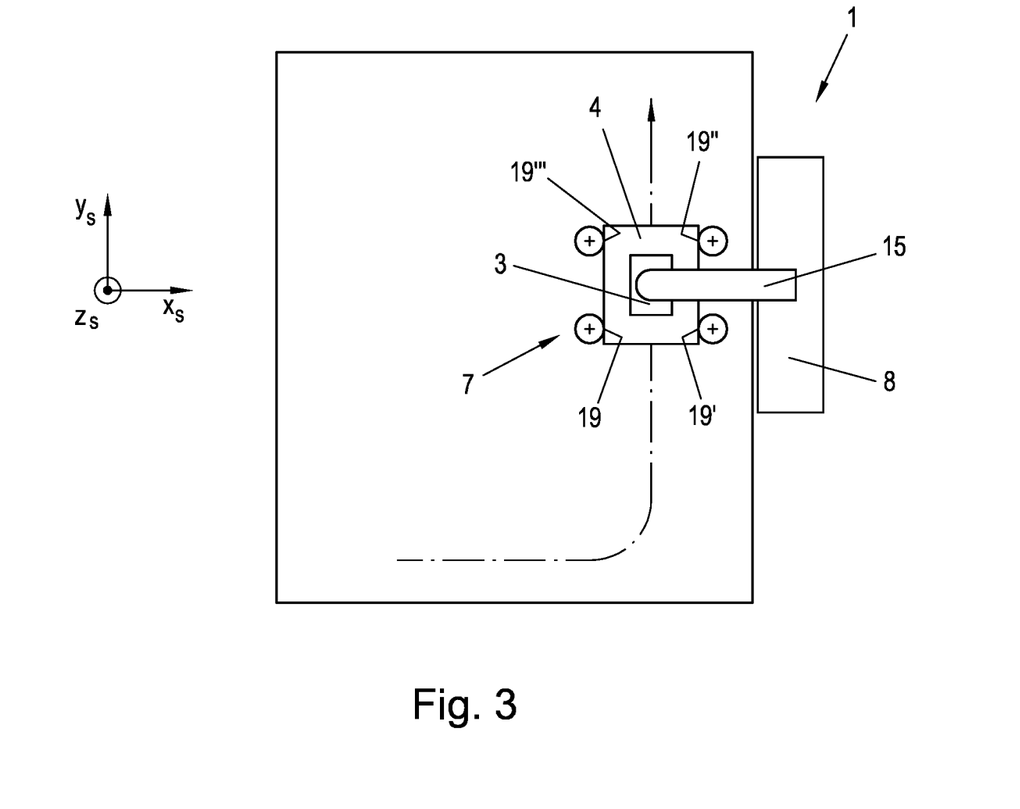
FIG. 3 is a schematic representation of a planar motor and a processing station according to a further embodiment in a top view, FIGS. 4 to 12 each show a processing station with differently designed support structures or transport units, each in a schematic representation.

FIG. 3 shows a further exemplary arrangement of a processing station 1 on a stator 6 of a planar motor 5. The processing in turn has a tool 15 which acts on a product 3 arranged on a transport unit 4. The tool 15 applies a torque acting about the $z_T$ axis on the product 3. (Such a process force acting as a moment can arise, for example, when inserting a screw or when screwing a lid onto a container, but also during numerous other processing steps such as drilling or milling). In this case, the support structure 7 ensures that the torque applied by the tool 15 neither rotates the product 3 nor the transport unit 4 out of its position. For this purpose, the support structure 7 has a plurality of (four in the exemplary illustrated case) support points 19-19''', each of which supports the transport unit 4 on two opposite sides thereof while the transport unit is in the support position. In this case, the support structure 7 not only prevents rotation about the vertical axis $z_S$, but also a movement along the first main axis $x_S$. The support points 19 can, for example, be designed as rollers or balls or have another shape that allows the transport unit 4 to be supported essentially in a punctiform manner. In connection with the present disclosure, "essentially punctiform support" refers to a support that allows an object that is attached to this support with a flat surface to pivot about at least one axis of this support.

FIGS. 4 to 12 show different embodiments of support structures 7, wherein a schematic bottom view of a transport unit 4, a top view of a region of the processing station 1 with the support structure 7 and a side view of this region of the processing station 1 are shown one below the other. The directions given in the following description relate to the coordinate system shown. This is purely for better understandability and writability and is not to be interpreted restrictively. In particular, the relevant support structures can also be arranged at a different angle if this is necessary and makes sense technically for the particular case.

Figure 4:
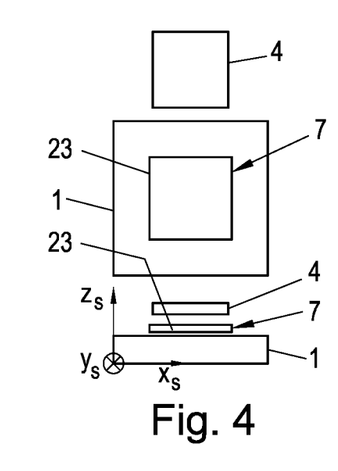

FIG. 4 shows a transport unit 4 having an essentially square base area and an essentially constant thickness, for example in the form of a cuboid. In the region of the processing station 1 in which the transport unit 4 is to be positioned by the stator 6 for processing, a support structure 7 is provided in the form of an essentially square support mat 23. The support mat 23 can be arranged, for example, on a flat bracket which is mounted on a base 8, so that process forces that act on the support structure 7 are diverted, not through the stator 6, but directly to the base 8. (A base 8 is not shown in FIG. 4, but it can be designed analogously to the base shown in FIG. 1). The support mat 23 can include a non-magnetic material, for example, a plastic or a rubber material. The base area of the support mat 23 is preferably somewhat larger than the transport unit 4 in order to optimally support it (however, this is not a mandatory requirement). With a low coefficient of friction of the material compared to the transport unit 4 (smooth surface), the support mat can support the transport unit 4, which is pressed against it via process forces, (essentially) only in the direction of the vertical axis $z_S$, i.e., it can develop a pure supporting force in this direction. On the other hand, the support mat 23 can also have a high coefficient of friction (and be designed as a rubber mat, for example), wherein the movement of the transport unit 4 is then also supported in other directions by the friction. In some cases, a sliding surface can also have direction-dependent sliding or adhesion properties.

Figure 5:
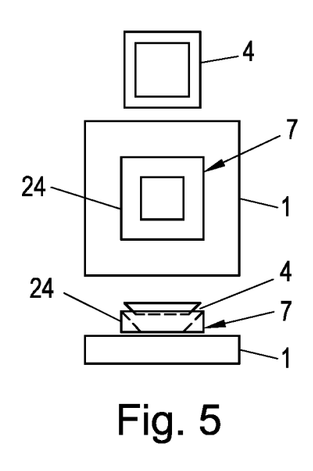

FIG. 5 shows a transport unit 4 having an essentially square base area, wherein the side faces, however, are beveled, so that the horizontal (i.e. viewed in $x_T$-$y_T$ plane) cross section of the transport unit 4 tapers towards the stator. A support structure 7 in the form of a rectangular frame 24 is provided in the region of the processing station 1 in which the transport unit 4 of the stator 6 is to be positioned for processing, wherein the edges of the frame 24 have a triangular cross section. The frame 24 forms a support surface which is inclined towards the inside of the frame, the inclination and shape of which are designed to match the inclination of the transport unit 4. As a result, the transport unit 4 can be moved by the stator over the frame 24 and then lowered until the transport unit 4 with its bevels abut in a form-fitting manner against the support surface of the frame 24. The form-fitting receptacle essentially completely restricts the degrees of freedom of the transport unit 4, wherein only a translational movement in the direction of the positive vertical axis $z_T$ is possible in order to lift the transport unit 4 (with the aid of the stator) and move it out of the processing station in a floating manner.

Figure 6:
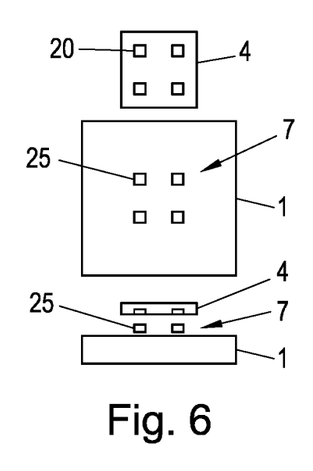

FIG. 6 shows a transport unit 4 in the underside of which (i.e., its surface directed towards the stator) recesses 20 are provided which allow the transport unit to be "placed" in a form-fitting manner on the support structure 7. For this purpose, the support structure 7 has a plurality of cuboid elevations 25 which are designed to match the recesses 20.

Figure 7:
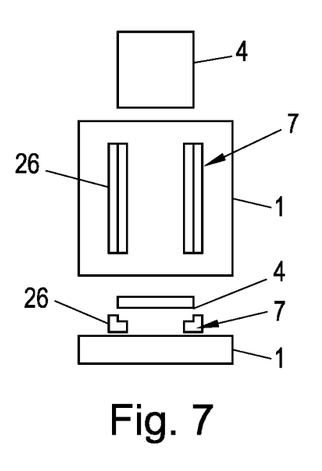

FIG. 7 shows an essentially cuboid transport unit 4. The support structure 7 has two elongated profile rails 26 which are arranged parallel to one another. The profile rails 26 have an essentially L-shaped cross section, wherein the distance (viewed in $x_S$-$z_S$ plane) of the two fillet angles of the profile rails 26 is matched to the transport unit 4 and allows a form-fitting reception of the transport unit 4. The movement of the transport unit is secured by the profile rails 26 (in addition to the supporting effect in the direction of the vertical axis) against displacement in the direction of the first main axis $x_S$, wherein a movement along the second main axis $y_S$ is still possible (provided that no frictional forces which cannot be overcome with the available force action prevent this).

Figure 8:
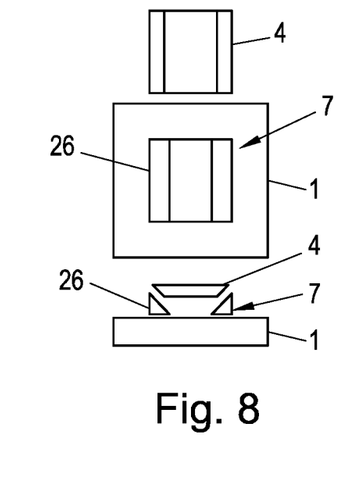

FIG. 8 shows a processing station 1 with a support structure 7, which in turn has two parallel profile rails 26. In this case, the profile rails 26 have a triangular cross section, so that two opposite inclined support surfaces are formed on which the transport unit 4 can be attached. In some cases, the transport unit 4 can have at least two opposing beveled side surfaces, so that a form-fitting attachment to the profile rails 26 is possible. For example, however, a transport unit 4 in the form shown in FIG. 5 can also be attached to this support structure in a form-fitting manner.

Figure 9:
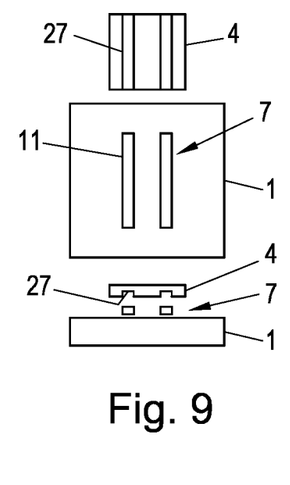

FIG. 9 shows a transport unit 4 in which recesses are provided. In this case, two recesses are provided which form two grooves 27 running parallel over the entire underside of the transport unit. In this context, the surface facing the stator is again referred to as the "underside," regardless of the actual alignment of the transport unit 4 and the transport plane 2 of the corresponding stator 6. The support structure 7 has two parallel rail guides 11 with a rectangular cross section, the spacing of which corresponds to the spacing of the recesses 20. The rail guides 11 arranged in the recesses 20 prevent at least a movement transverse to the rail axis and also a rotation about the first main axis $z_S$ is prevented. A movement along the second main axis $y_S$ is also possible.

In the embodiments shown in FIG. 4-9, the support structure 7 can also be arranged above or to the side of the transport unit, so that forces in the positive z-direction or forces acting laterally can also be absorbed. In this way, for example, process forces that are directed upwards or to the side can also be diverted. This also has the advantage that the minimum thickness of the support structure is not limited to the maximum air gap (or less).

Figure 10:
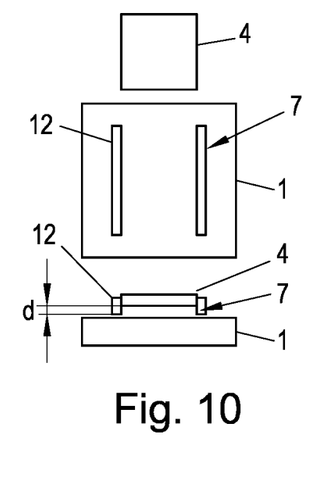

FIG. 10 shows a support structure 7 which has two parallel side guides 12. The side guides 12 have a spacing that is matched to the width of the transport unit 4, wherein the transport unit 4 arranged between the guides is restricted to a movement in the direction of the side guides 12, wherein the height, i.e. the air gap, can still be changed, however, by raising and lowering the transport unit in the direction of the vertical axis $z_S$. A movement along the second main axis $y_S$ is also possible.

Figure 11:
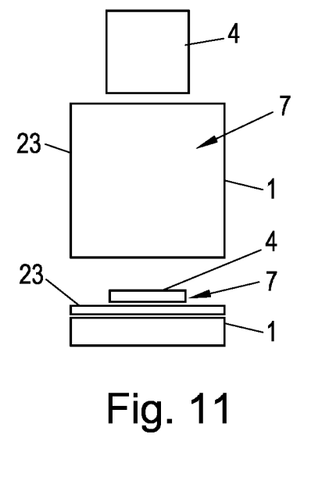

FIG. 11 shows a processing station 1 with a support structure 7 in the form of a support mat 23. The support mat 23 has a surface which is significantly larger than the base area of the transport unit 4. As a result, the transport unit 4 can be placed on the support mat 23 in different positions. On the other hand, this support structure can be used by transport units 4 of different sizes. If necessary, the surface of the support mat 23 can also be designed as a sliding surface, wherein the sliding properties can be either constant or variable. For example, the support mat 23 can have a direction-dependent sliding capability, or only certain regions can allow sliding, for example sliding over a certain path provided on the surface of the support mat 23. The support mat 23 can in turn be attached to a base 8, not shown in FIG. 11 (this feature can also be applied to the other support structures 7 shown here), so that the stator surface is spared both process forces and support forces.

Figure 12:
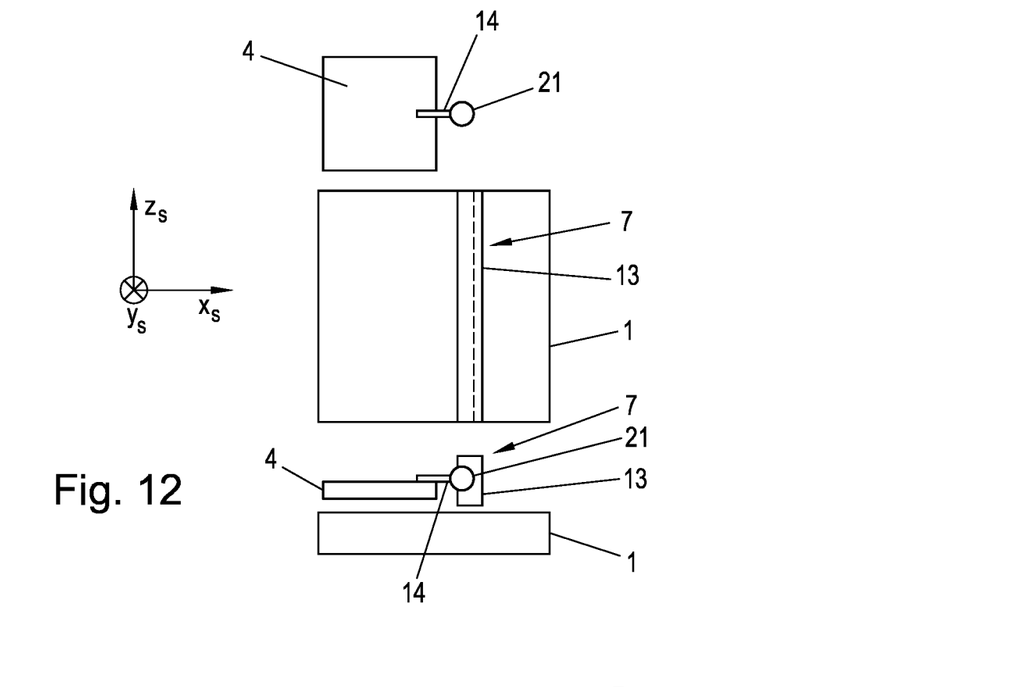

FIG. 12 shows a processing station 1 with a support structure 7 in the form of a guide structure 13. A holding arrangement 14 with a sliding element 21, which can be brought into engagement with the guide structure 13, is fastened to the transport unit 4. The sliding element 21 is slidably guided in the guide structure 13 in the manner of a linear guide. In the embodiment shown in FIG. 12, the sliding element 21 has a spherical design, wherein the guide structure 13 has a cylindrical recess running parallel to the transport plane 2 in which the spherical sliding element 21 is suitably received. This allows the transport unit 4 to rotate about the center of the ball of the sliding element 21 in all rotational degrees of freedom, but a translational movement of the transport unit 4 is only possible along the linear guide defined by the guide structure 13.

Alternatively, the holding arrangement 14 (or its sliding element 21) and the guide structure 13 can also have other shapes that are matched to one another, wherein a rotation about one or more axes, for example, can also be restricted by the form-fitting reception of the sliding element 21 in the guide structure 13. The selection and design of appropriate design forms are, given knowledge of the teachings disclosed herein, within the ability of an average person skilled in the art.

In all of the embodiments described above, the surfaces of the support structure 7 can either have a high coefficient of friction, so that process forces can also be absorbed with the aid of friction, or they can be designed as sliding surfaces, so that any frictional forces are minimized. Sliding surfaces can also have different sliding properties, for example as described above in relation to individual embodiments. The sliding surfaces can also have direction-dependent friction properties, so that, for example, movement is only possible in one direction with low friction. If necessary, additional bearing elements, such as rollers or ball bearings, can be provided in order to minimize sliding friction between the transport element 4 and the support structure 7. The support structure can optionally also be made contactless, for example via air bearings and/or passive magnetic bearings and/or active magnetic bearings.

Depending on the embodiment and area of application, the support structures 7 can be made of different materials, for example metals, plastics, rubber materials or combinations of such and similar materials. With knowledge of the teachings disclosed herein, an average person skilled in the art is able to sensibly select suitable combinations of materials through routine work and tests, taking into account the stated secondary conditions.

Figure 13:
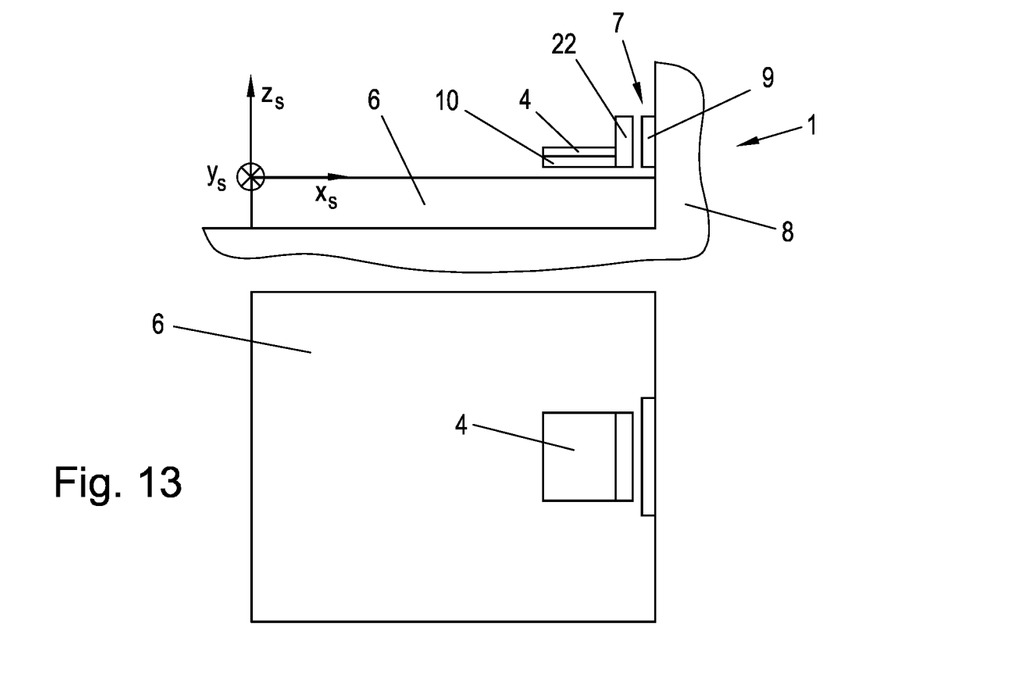
FIG. 13 shows a further embodiment of a processing station in a schematic representation and FIGS. 14A and 14B show an illustration of a planar motor with a support structure arranged thereon in a top view and a side view.

FIG. 13 shows a further embodiment of a support structure 7, wherein the support forces can be applied to the transport unit 4 without contact. For this purpose, the transport unit 4 has, in addition to the usual drive magnet arrangement 10 which interacts with the stator 6 of the planar motor 5, a support magnet arrangement 22, which, in the case shown, is arranged normal to the drive magnet arrangement 10 on one side of the transport unit 4 (i.e., parallel to the vertical axis $z_T$). As a support structure 7, a support coil arrangement 9 is arranged above the stator 6 on a base 8 and can be controlled independently of the stator 6 and generates a magnetic field which acts on the support magnet arrangement 22 if the transport unit 4 is arranged in the illustrated support position, or moves within this region. If necessary, instead of a support coil arrangement 9, a (passive) support magnet arrangement can also be provided. In FIG. 13, the support coil arrangement 9 is arranged in a plane parallel to the vertical axis $z_S$ (i.e. normal to the transport plane 2). The support coil arrangement 9 can, however, also be arranged parallel to the stator 6, for example below or above the stator 6, and intensify the magnetic field generated by the stator 6 specifically in the region of the processing station 1. The magnetic field generated by the support coil arrangement 9 can also act on the drive magnet arrangement 10, so that no additional support magnet arrangement 22 has to be provided on the transport unit 4. With the support coil arrangement 9, the process forces can be diverted to the base via the transport unit 4 in a contact-free manner by application of additional magnetic forces to the transport unit 4 which counteract the process forces. The practical possibilities can be varied in many ways by the selected shape and design of the support coil arrangement 9 and/or the support magnet arrangement 22.

Instead of the support coil arrangement 9 or in addition thereto, a nozzle arrangement (not shown) can also be provided which ejects a fluid, wherein the fluid flow is directed towards the transport unit 4 and exerts a force on it.

Figure 14A:
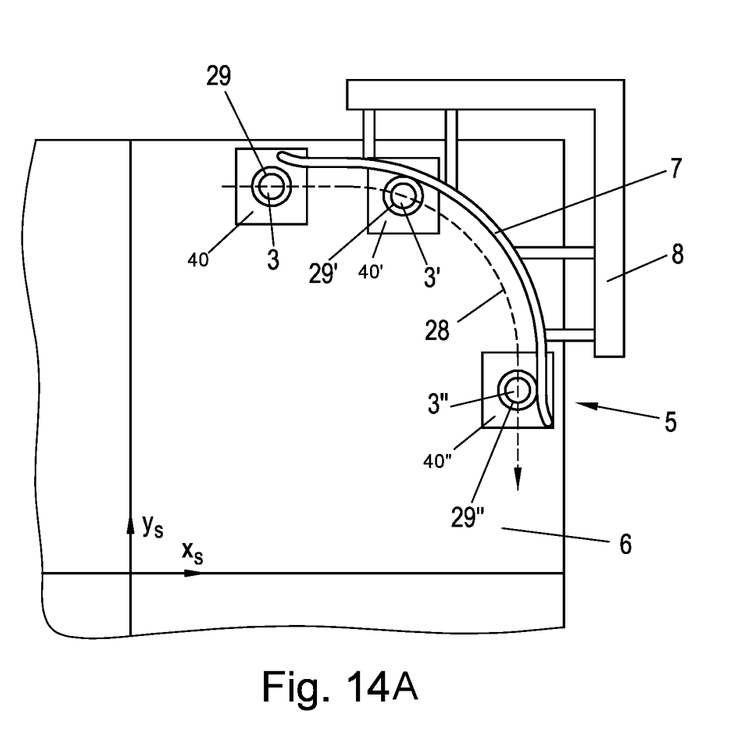
Figure 14B:
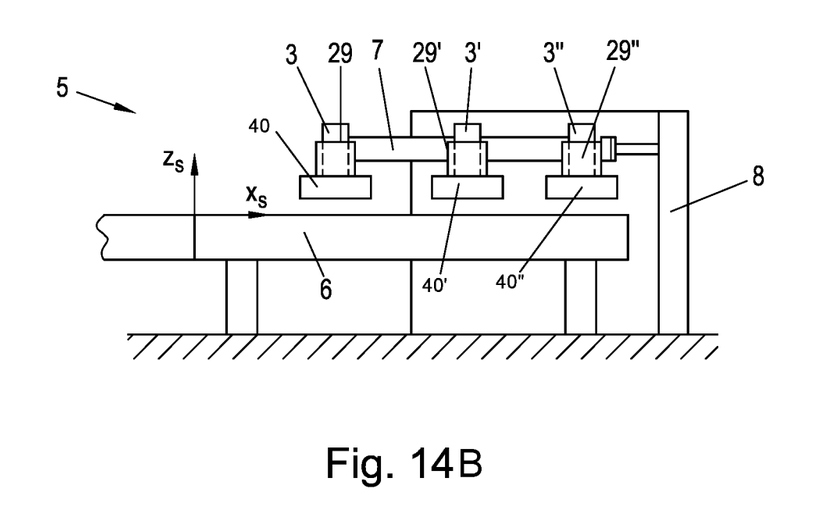

FIGS. 14A and 14B show a planar motor 5 according to a further embodiment. On a stator 6 of the planar motor 5, three transport units 40, 40', 40" are shown which are moved by the stator 6 in a floating manner along a curved movement path 28. The movement path 28 essentially describes a 90° curve with a constant radius. Because of the change in direction, inertial forces act on the transport units 40, 40', 40" and the products 3, 3', 3" transported by the transport units 40, 40', 40" in the curve. The transport units 40, 40', 40" each have ring-like receptacles 29, 29', 29" in which the (essentially cylindrical) products 3, 3', 3" are placed and held. At higher speeds, these inertial forces can no longer be adequately compensated by the stator 6. In this case, the transport units 40, 40', 40" could be thrown "off track" or tilt in an impermissible manner and thereby become uncontrollable. The tilting is of particular concern with products 3, 3', 3", which have a high center of gravity. If necessary, a product 3 could also detach itself from its receptacles 29 due to inertia and fall from the transport unit 40. In FIGS. 14A and 14B, the products 3, 3', 3" are of cylindrical design. In practice, it could be, for example, vessels or bottles that are arranged upright on the transport units 40, 40', 40" (or in a corresponding receptacle 29, 29', 29" of the relevant transport unit 40, 40', 40"). In order to allow the transport units 40, 40', 40" to travel safely around curves even at high speeds, a support structure 7 is provided which is attached to a base 8 and is arranged over the surface area of the stator 6 around the transport units 40, 40', 40" (and thus the product 3, 3', 3") during travel around curves. The transport unit travels in a straight line towards the support structure (transport unit 4) until the receptacle 29, 29', 29" arranged on the transport unit 40 attaches to the support structure 7 before the beginning of the curve. During travel around curves, the receptacle 29 slides on the support structure 7 until the curve ends and the transport unit returns to a straight journey (transport unit 40"). As an alternative or in addition, the support structure 7 can also accumulate on the product 3 and support it. In a similar way, a support structure 7 can also be provided as a fall protection for the transport unit 40. If necessary, instead of the sliding surface shown in FIGS. 14A and 14B on which the receptacles 29 attach, a roller arrangement or the like can also be provided on the support structure 7 in order to minimize frictional forces between the support structure 7 and the receptacles 29 (or the transport unit 40).

Alternatively, a support structure 7 can support the transport unit 4, 40 (or the receptacle 29 and/or the product 3) also to compensate for gravitational forces, for example in the direction of the vertical axis z for stators arranged flat, in order to allow the reception and transport of loads that, without a support structure 7, would exceed the load capacity of the transport unit 4, 40 over defined ranges. Corresponding support structures 7 are preferably arranged on a base 8 and fastened independently of the stators 6, i.e. the supporting forces that are absorbed by the support structure 7 do not act on the stator 6 through the transport unit 4, but are delivered directly to the base 8 without impairing the stator 6 (in particular with regard to its mechanical load capacity). Even with vertically arranged stators 6, support structures, which in this case run parallel to the transport plane 7, can be provided for absorbing gravitational forces.

In all of the embodiments described herein, the product 3 can usually (but not necessarily) be permanently connected to the transport unit 4, 40. For example, the product 3 can be arranged in a form-fitting manner in a receptacle of the transport unit 4 and/or in some cases attached thereto with appropriate fasteners. Between the product 3 and the transport unit. 40, there are then no internal degrees of freedom relevant to the transport or processing. The unit made up of the transport unit 4, 40 and the product 3 can then essentially be viewed as a solid unit. A restriction of the degrees of freedom of the product 3 by a supporting force acting on the product therefore restricts the degrees of freedom of the transport unit 4 in this case practically in the same way as if the supporting force were acting directly on the transport unit 4, 40. On the other hand, the product 3 can also be fastened to the transport unit 4, 40 in a way that allows a restricted movement relative to the transport unit 4, 40. For example, the transport unit 4, 40 can have a pivotable attachment for liquid containers, so that they are always transported with the opening facing upwards.

All of the embodiments described above have been described with reference to the orientation and arrangement as shown in the corresponding figures. However, the corresponding arrangement is in each case purely exemplary and not restrictive. With knowledge of the teachings disclosed herein, a person skilled in the art is readily able to adapt and modify the arrangement and design of the support structure 7 in relation to a stator 6 of a planar motor 5, as well as the shape and design of the transport unit 4, 40, in order to achieve a desired or required absorption of process forces and moments.

The individual features and variants specified in the individual configurations and examples can (unless otherwise stated then and there) be freely combined with those of the other examples and configurations and in particular to characterize the invention in the claims without necessarily including the other details of the relevant design or the relevant example.

In the description and claims, the terms "substantially" or "approximately," unless otherwise stated then and there, mean a deviation of up to 10% of the stated value, if physically possible, both downwards and upwards, otherwise only in the direction that makes sense, degree indications (angle and temperature) to be understood as ±10°.

Terms that describe a spatial arrangement, such as "above," "below," "next to," "to the side," "horizontal," "vertical," "right," "left" and the like relate to the position in the described figure, or, if nothing else is specifically indicated, to an arrangement of the planar motor 5, the transport plane 2 of which is arranged horizontally. Such terms are only used to make the description easier to understand and are not to be interpreted as restrictive.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE SIGNS

Processing station 1
Transport level 2
Product 3, 3', 3"
Transport unit 4, 4', 40, 40', 40"
Planar motor 5
Stator 6
Support structure 7
Base 8
Support coil assembly 9
Drive magnet assembly 10
Rail guides 11
Side guide 12
Guide structure 13
Retainer assembly 14
Tool 15
Support element 16, 16'
Roller arrangement 17
Roller assembly 18
Support point 19
Recesses 20
Sliding element 21
Support magnet assembly 22
Support mat 23
Frame 24
Elevation 25
Profile rails 26
Grooves 27
Movement path 28

What is claimed:

1. A support structure for a transport unit of a planar motor, wherein the transport unit is movable by at least one stator of the planar motor and a product can be arranged on the transport unit, the support structure comprising:
   at least one support position at which at least one supporting force is applied to the transport unit, while at least one process force acts on the product,
   wherein the process force is at least partially transmitted from the product to the transport unit, and the at least one supporting force counteracts the at least one process force,
   wherein the transport unit is movable in a floating manner into and out of the support position via the at least one stator of the planar motor,
   a base to which the support structure is mounted so as to at least partially divert counterforces caused by the support force to the base; and
   the support position is arranged so that a transmission of force to an active surface of the stator is reduced.

2. The support structure according to claim 1, wherein the support position is arranged so that a transmission of force to an active surface of the stator is prevented.

3. The support structure according to claim 1, wherein the base is mounted on a supporting structure to which at least one stator is mounted.

4. The support structure according to claim 1, wherein the support structure is arranged to act without contact on the transport unit.

5. The support structure according to claim 1, further comprising at least one of a support coil arrangement or a support magnet arrangement which acts on at least one of a drive magnet arrangement or a support magnet arrangement of the transport unit.

6. The support structure according to claim 1, further comprising a slip-inhibiting shaped structure.

7. The support structure according to claim 6, wherein the slip-inhibiting shaped structure comprises at least one of a support mat, a frame, or at least one elevation or depression.

8. The support structure according to claim 1, further comprising a sliding structure.

9. The support structure according to claim 8, wherein the sliding structure comprises at least one profile rail, rail guide, lateral guide or sliding surface.

10. The support structure according to claim 1, wherein the support structure forms a guide structure into which a holding arrangement arranged on the transport unit can be brought for engagement.

11. The support structure according to claim 10, wherein the guide structure forms a linear guide in which a sliding element of the holding arrangement can be brought into sliding engagement.

12. A processing station for processing a product that is arranged on a transport unit of a planar motor, wherein at least one process force, which acts on the product during processing, is transmitted via the product to the transport unit, the processing station comprising:
   at least one support structure according to claim 1,
   wherein the transport unit is positionable in the at least one support position during the processing.

13. The processing station according to claim 12, wherein the process force is a force applied by at least one of a tool, a magnetic or electromagnetic force, an inertial force, a moment caused by such forces or a combination of such forces.

14. The processing station according to claim 12, further comprising a base, wherein the support structure is mounted to the base, and the support structure at least partially diverts a counterforce caused by the support force to the base.

15. The processing station according to claim 14, wherein the base is mounted on a supporting structure to which at least one stator is mounted.

16. A planar motor comprising the processing station according to claim 12.

17. A method for a controlled drive of a transport unit along the planar motor according to claim 16, the method comprising:
- floating movement of the transport unit into a support position via at least one stator of the planar motor,
- applying at least a process force that acts on a product arranged on the transport unit and is transmitted to the transport unit,
- applying at least a supporting force via the support structure to the transport unit, wherein the support force counteracts the at least one process force, and
- floating movement of the transport unit out of the support position via the at least one stator of the planar motor.

\* \* \* \* \*